Patented Aug. 18, 1942

2,293,099

UNITED STATES PATENT OFFICE 2,293,099

PROCESS OF MAKING CERAMIC BONDED ARTICLES

John F. Barnes, Niagara Falls, Wilber F. Parsons, Kenmore, and Garret Van Nimwegen, Niagara Falls, N. Y., assignors to The Carborundum Company, Niagara Falls, N. Y., a corporation of Delaware No Drawing. Application February 24, 1939, Serial No. 258,232

7 Claims. (Cl. 25—156)

This invention relates to ceramic articles. More specifically, the invention is concerned with the production of ceramic articles such as abrasives, refractories, filtering media, grinding wheels, tile and the like.

Abrasive products are generally formed by a pressing or a casting process. In the pressed wheel process, abrasive, permanent bond and a small amount of temporary binder are mixed with a small amount of water, just enough water being used to cause the mix to cohere after pressing. In the puddled wheel or slip-casting process, a much larger amount of water, together with a small amount of temporary binder, is used in order that the mix may be poured or cast into molds.

It has also been proposed to form ceramic bonded articles by casting wherein certain materials are used as temporary binders which are later burned out to leave the final ceramic bonded article. In this capacity rubber latex has been used. However, much trouble has been encountered in the use of temporary binders such as rubber latex when used in connection with certain abrasive grains and ceramic bonds in that premature precipitation or coagulation of the mix takes place and makes the casting operation extremely difficult and at times even impossible. At other times where casting of ceramic bonded abrasive shapes using temporary bonds has been possible the process has necessitated a lengthy retention of the mix within the mold for complete setting up of the mixture to rigid form and a long period of drying. Coagulation is allowed to take place as a natural result of the withdrawal of water from the casting mix by the porous mold. It, therefore, often requires large numbers of porous molds which after repeated use lose their efficiency to the point of requiring reconditioning.

We found it to be very advantageous to use rubber latex as a temporary binder in such a way that there is maintained a close control of the time and speed of the agglomeration of the rubber particles of the latex.

According to our present methods of regulating the agglomeration of the rubber particles in the latex, a two-fold purpose is kept in mind and carried out. First, any appreciable agglomeration of the rubber particles prior to the actual pouring operation is prevented or retarded so that at the most only a very slight flocculation is allowed to occur. This slight, almost unnoticeable, flocculation, as will become apparent later, is, in fact, a beneficial feature of our process where porous molds are used. After the mix has been cast into the mold the agglomeration is caused to quicken and take place as a result of controlled chemical or physical measures which, by speeding up the coagulation, lessen the time required to keep the mix in the mold before setting. Thus by our controlled agglomeration, not only is undue premature congealing of the mix prevented prior to the casting operation, but also the agglomeration subsequent to casting is brought about more efficiently and quickly than by former methods.

So, by controlled agglomeration of the rubber particles of the latex in the mold prior to the removal of the greater part of the water in the mix, the mold capacity is increased and the drying time decreased. The controlled agglomeration of the rubber in the latex both before and after the casting operation also prevents the solid, suspended ceramic material from settling non-uniformly out of the fluid due to differences in density of the abrasive and bond. Thus, a more uniform abrasive article is produced. A further advantage is that when the rubber particles in the latex are slightly flocculated into larger size particles prior to the casting or pouring step, we are enabled to use porous water absorbent molds without clogging the pores of the mold, thus saving molds and speeding the rate of drying. Further, by the use of suitable agglomerating agents, we may use non-water-absorbent molds, removing the agglomerated mixture from the molds to facilitate drying and leave the molds available for immediate and repeated use.

Since the coagulation, flocculation or gellation of latex are the result of the rubber particles agglomerating into larger units, we wish to define the term "to agglomerate" as used in this specification and its appended claims as a broad term covering "to coagulate," "to flocculate" and "to gell."

We accomplish this controlled or regulated agglomeration of the rubber particles of the latex by the use of chemical reagents or by physical means or by a combination of the two. Several classes of agglomerating agents or coagulants with their respective manners of functioning and the various techniques of using them are given below. The selection of the proper reagent and method of controlling the agglomeration from those given depends to a large extent upon the size of article being made, the kind of internal structure desired, the type of mold being used, and so forth.

In general, we have found that there is a large variety of agglomerating agents for latex which may be used to carry out our invention. We may use substances that act as delayed coagulants, such as magnesium sulfate, ammonium sulfate, formaldehyde, diphenylguanidine, salts of divalent metals and sodium silicofluoride.

Premature coagulation before the casting or pouring of the mix into the mold can be prevented or kept under control by adjustment of the proportion and type of coagulant used. Also, undue coagulation of the slip before entering the mold can be prevented by suitable regulation and maintenance of the pH value of the casting slip within certain limits prior to the casting operation. We have found pH values between 8½ and 12 to be preferred for the casting mix before placing in the mold and to be the most favorable to the process. The use of further coagulant or chemical reagent and/or regulation of the temperature promotes or hastens coagulation after the mix has been poured into the mold. Even the delayed reaction of the coagulants previously added alone is sufficient to bring about coagulation in the mold. Thus, we are enabled to add the coagulant to the mix before casting with the coagulation taking place after casting. For example, certain salts which ordinarily coagulate latex may be added in small quantity so that coagulation is not effected at room temperature but at higher temperatures, such as 80 to 90° C. Suitable heat sensitizing agents that, in small quantities will cause gellation on heating, are calcium sulfate, zinc carbonate, ammonium nitrate, ammonium chloride and ammonium sulfate.

We may coagulate the cast mixture of latex and ceramic material by subjecting it to a coagulating agent which serves the dual purpose of agglomerating the rubber and removing the water. Suitable agents for this purpose are strong acid, strong potassium, sodium and ammonium salt solutions, alcohol and glycerine.

We may very slightly flocculate the rubber in the mixture of latex and ceramic materials with mild acting materials such as monobasic and dibasic sodium phosphate and boric acid before casting. In using porous molds, such as gypsum molds, this helps to prevent the molds from plugging and facilitates the extraction of moisture. However, in our method it is usually preferred to use a substantially non-porous mold whereby the mold is not to any extent rendered inefficient by absorption of large amounts of water.

It may not be permissible to leave inorganic agglomerating agents in the mix after ignition, in which case we use volatile coagulants such as acetic and formic acid or use soluble coagulants in such a manner that they are easily washed out. Thus contamination of the ceramic bond with inorganic agglomerating agents is avoided.

According to a further modification of our invention, we may coagulate the mixture of latex and ceramic material after it has been placed in the mold by physical means. For instance, the temperature of the mold and contents can be raised or lowered to an extent where coagulation will take place. If desired, the mold contents may be raised in temperature by subjecting the mold to steam pressure. The uncoagulated mix after it has been cast into the mold can also be coagulated by the action of high-frequency currents.

Having generally described the invention, several specific examples are now offered by way of illustration, it being understood that these examples are for illustrative purposes only and are not intended to limit the invention in any way.

*Example I.*—A mixture of ceramic materials consisting of 1840 parts by weight of 40 grit fused alumina grain and 160 parts by weight clay bond are wet with 5 parts by weight of a 25% solution of a wetting and stabilizing agent sold under the trade name "Aresklene" and described as an alkyl sulfonated aromatic compound. 100 parts by weight of a latex containing 44 parts by weight of rubber are then mixed in.

A tin or other non-porous mold is then wet with a solution consisting of 300 grams of calcium chloride in 1000 cc. of alcohol. The above latex-ceramic mixture is then poured into the mold and vibrated to form a homogeneous mass, after which additional calcium chloride-alcohol solution is poured on top of the mix. After a half hour, the latex is sufficiently coagulated by diffusion of the coagulant to permit the molded article to be inverted onto a ceramic plate and washed, dried and fired to burn off the latex and unite the ceramic bond.

A solution of formic acid in acetone may be used in place of the calcium chloride-alcohol solution.

*Example II.*—In making up ceramic articles of comparatively large cross-section the following mixture of materials has been found to be particularly satisfactory:

| | | |
|---|---|---|
| 40 grit fused alumina grain | grams | 1410 |
| Clay bond | do | 90 |
| 60% latex (Lotol) | cc | 140 |
| 25% Aresklene solution | cc | 5 |
| Water | cc | 50 |
| Diphenylguanidine | grams | .28 |

In mixing the above ingredients together the preferred procedure is to thoroughly mix the alumina grain and clay bond, after which the water containing the Aresklene solution is added, followed lastly by incorporation of the latex solution, to which has been previously added the diphenylguanidine. If it is desired to delay the agglomeration still longer the diphenylguanidine may be withheld and added and mixed in separately just prior to the casting or puddling step.

After proper admixing of the materials as described above, the mixture is then poured into a mold and treated in the same manner as is set forth in connection with Example I, the mold also receiving the same treatment.

As will appear from the previous discussion and examples, our invention is capable of many modifications.

A large variety of ceramic materials and abrasives may be used. Suitable stabilizers and compounding ingredients may also be used with the temporary binders.

These modifications are apparent from the foregoing descriptions and the invention is to be limited only by the scope of the following claims.

We claim:

1. In the manufacture of ceramically bonded abrasive articles, the steps which comprise coating the inner surface of the mold with a material that has a coagulating influence on partially stabilized rubber latex, mixing abrasive particles and clay with a material that has a limited stabilizing effect on the rubber latex, incorporating rubber latex into the abrasive mix, pouring the abrasive mix thus made into said coated mold, vibrating the mold to make the abrasive mix substantially uniform, coagulating the latex to maintain a substantially uniform distribution of abrasive particles and bond, removing the molded article after the coagulation of the rubber latex throughout said article, and firing the article to burn off the organic constituents and mature the ceramic bond.

2. The method of making an abrasive article which comprises mixing fused alumina grain with a ceramic bond amounting to less than ten per cent of the aluminous grain, wetting the grain and bond with a stabilizer for rubber latex, incorporating in the mixture rubber latex along with a material which becomes a coagulator on heating, pouring the mix into a mold, vibrating the mold and its contents, adding additional delayed coagulating material on top of the mix, heating the mold and its contents, drying the coagulated mix, and firing the molded and dried article to temperatures high enough to remove the organic constituents and to unite the ceramic bond to the abrasive particles.

3. The method described in claim 2 in which the stabilizer is a solution of an alkyl sulfonated aromatic compound.

4. The method described in claim 2 in which diphenylguanidine is used as an aid to coagulation.

5. The method of making an abrasive article which comprises mixing abrasive grain with a ceramic bond amounting to less than 10 per cent of the abrasive grain, wetting the grain and bond with a stabilizer for rubber latex, incorporating in the mixture rubber latex along with a material which becomes a coagulator on heating, pouring the mix into a mold, vibrating the mold and its contents, adding additional delayed coagulating material, heating the mold and its contents until coagulation takes place, drying the coagulated mix, and firing the molded and dried article to a temperature high enough to remove the organic constituents and to unite the ceramic bond to the abrasive particles.

6. The method described in claim 5 in which the stabilizer is a solution of an alkyl sulfonated aromatic compound.

7. The method described in claim 5 in which diphenylguanidine is used as an aid to coagulation.

JOHN F. BARNES.
WILBER F. PARSONS.
GARRET VAN NIMWEGEN.